C. H. GUNN.
VOLUMETRIC DISCHARGE FOR OIL TANKS.
APPLICATION FILED APR. 21, 1919.

1,330,939.

Patented Feb. 17, 1920.
2 SHEETS—SHEET 1.

INVENTOR.
Charles H. Gunn
BY
ATTORNEY

C. H. GUNN.
VOLUMETRIC DISCHARGE FOR OIL TANKS.
APPLICATION FILED APR. 21, 1919.
1,330,939.
Patented Feb. 17, 1920.
2 SHEETS—SHEET 2.
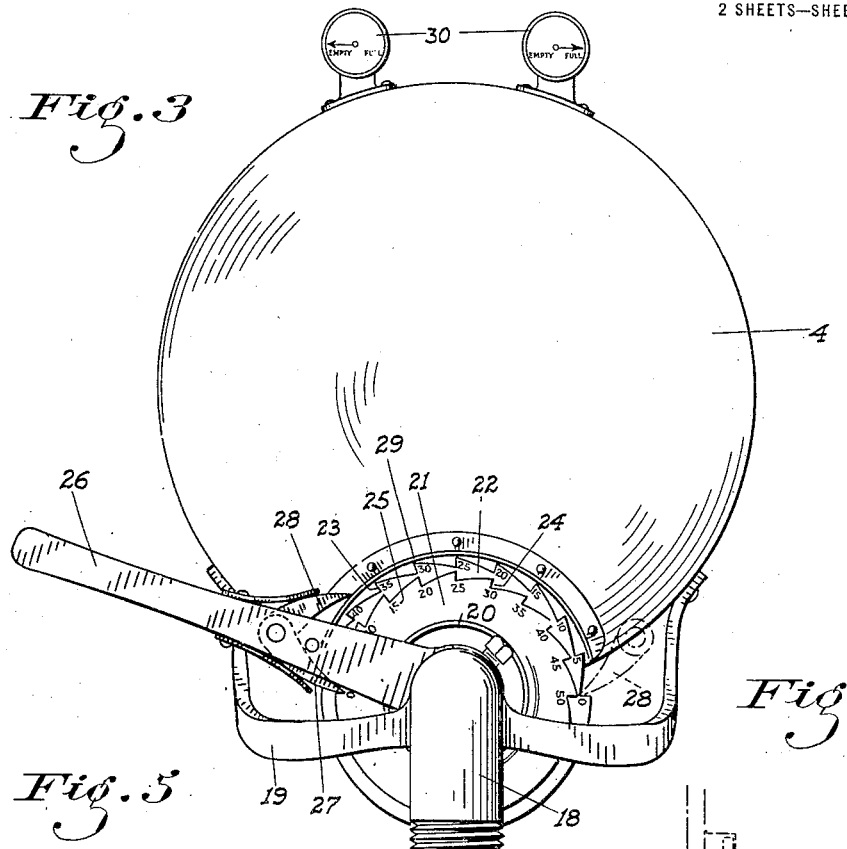
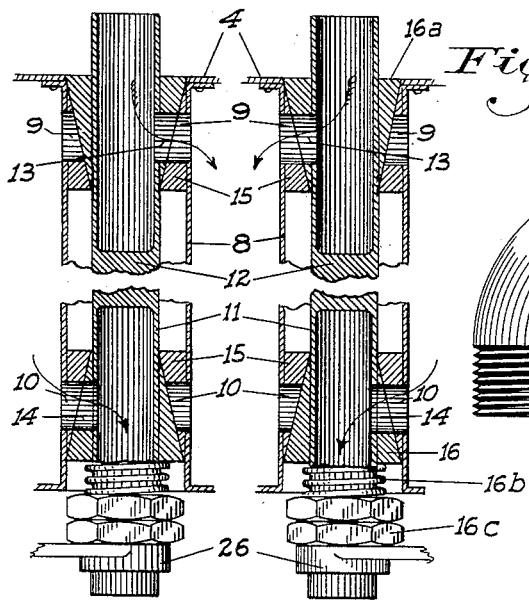
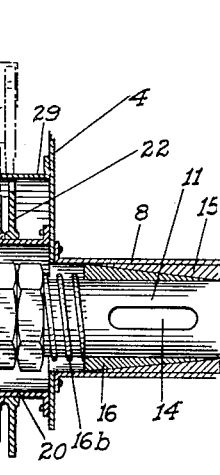
INVENTOR.
Charles H. Gunn
BY
ATTORNEY

UNITED STATES PATENT OFFICE.

CHARLES H. GUNN, OF EMERYVILLE, CALIFORNIA, ASSIGNOR OF ONE-NINTH TO C. H. BLACK, ONE-NINTH TO F. O. NEBEKER, AND TWO-NINTHS TO J. C. NEWCOMB, ALL OF OAKLAND, CALIFORNIA, AND TWO-NINTHS TO R. A. CASAROTTI, OF MARIN COUNTY, CALIFORNIA.

VOLUMETRIC DISCHARGE FOR OIL-TANKS.

1,330,939.     Specification of Letters Patent.     Patented Feb. 17, 1920.

Application filed April 21, 1919. Serial No. 291,524.

*To all whom it may concern:*

Be it known that I, CHARLES H. GUNN, a citizen of the United States of America, residing at Emeryville, in the county of Alameda, State of California, have invented certain new and useful Improvements in Volumetric Discharges for Oil-Tanks; and I do declare the following to be a clear, full, and exact description of the same, reference being had to the accompanying drawings, and to the characters of reference marked thereon, which form a part of this application.

This invention relates to improvements in a volumetric discharge means for oil tanks, being particularly adaptable for use in connection with oil tank trucks or wagons used to dispense gasolene and other fluids to service stations, garages, etc., in volumetric quantities.

With the system at present in use, a five gallon can is usually hung on the faucet of the wagon-tank and filled and emptied as many times as is necessary to deliver the desired quantity to the station or garage tank.

This is a very slow and laborious process, involving considerable hard manual work on the part of the operator, and also results in an appreciable waste of the fluid being dispensed, owing to the can used sometimes overflowing and from dripping at the faucet.

Also, with this system, it is hard to get an accurate measurement of the fluid, as the measuring can is sometimes filled to overflowing and at other times only partially filled.

These objectionable features and disadvantages I have overcome with my improved volumetric dispensing device, the principal object of which is to provide a means adapted to be attached to a wagon tank and permanently carried thereon and with which unlimited quantities of the fluid carried by the wagon may be dispensed or discharged in predetermined volumetric amounts directly into the station tank without work or attention on the part of the operator other than moving a small hand lever from one position to the other with the discharge of each volumetric quantity of the fluid.

Another object is to provide a means whereby the amount of fluid dispensed will be indicated on suitable dials easily visible by the operator so that there can be no dispute as to how much fluid has been discharged from the wagon tank.

Still another object is to produce a device so arranged that the discharge therefrom of the volumetric quantities of the fluid will be continuous with the throwing over of a hand lever.

A still further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claims.

On the drawings, similar characters of reference indicate corresponding parts in the several views.

Fig. 3 is a rear end view of my discharge receptacle, showing the quantity-indicating dials thereon.

Fig. 4 is a fragmentary vertical section through the rear end faucet of the receptacle.

Figs. 5 and 6 are sectional views showing a filling and discharging tube in different positions.

Figure 1:
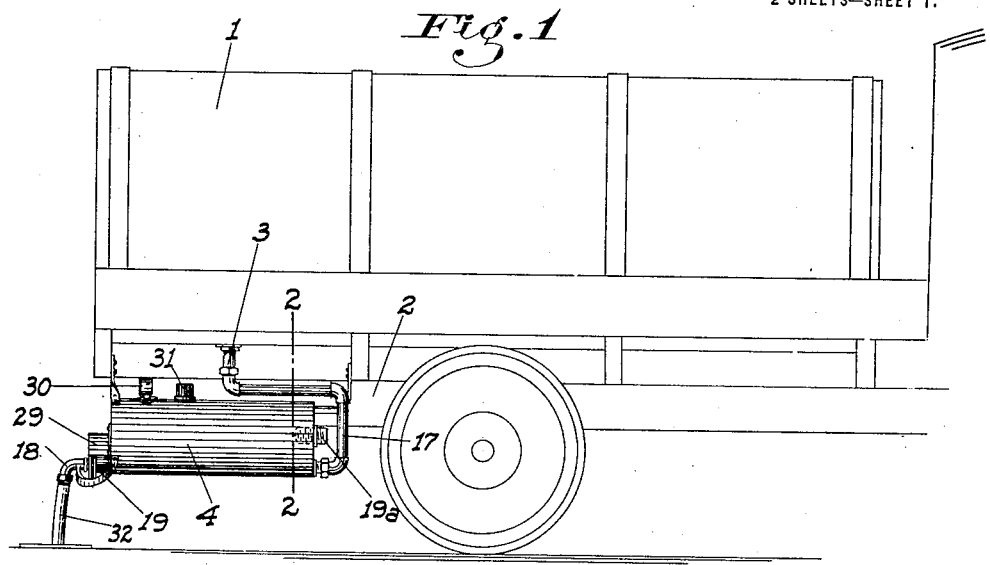
Figure 1 is a fragmentary view of an oil tank truck showing my improved dispenser installed thereon.

Referring now more particularly to the characters of reference on the drawings, the numeral 1 designates the wagon-tank mounted on a frame 2 and provided with a discharge faucet 3.

My invention comprises essentially a subsidiary tank 4 divided into two equal and independent chambers 5 and 6 by means of a vertical partition 7. At the lower end of the partition is formed a tubular sleeve 8, extending lengthwise of the tank and adapted to have communication with the chambers 5 and 6 by means of slots 9 therein on either side thereof at the forward end, and by similar ports 10 at the rear end. The area of each port is preferably the same as the cross-sectional area of the sleeve.

Turnably mounted in the sleeve 8 is a tube 11 having a central wall 12 therein. Adapted to register with either of the ports 9 is a port 13 in the tube 11, a similar port 14 being provided therein and adapted to register with one of the ports 10 and being on the opposite side of the tube 8 from the port 13. The tube 11 projects through the ends of the sleeve 8 and tank 4 at both ends.

Protection against leakage of the fluid in the tank between the tube and the sleeve is had by means of outwardly taper-holed bushings 15 secured in the sleeve 8, and through which the ports 9 and 10 extend, in which bushings seat tapered cones 16 and 16$^a$ positioned over the rear and forward ends respectively, of the tube 11, the ports 13 and 14 passing through these cones. The forward end cone 16$^a$ is firmly secured to the tube 11, but the cone 16 is slidable on the tube and is held in close contact with its respective bushing 15 by means of a spring 16$^b$ on the tube, and locknuts 16$^c$ threaded onto the tube and impinging against the spring.

The tapered surfaces at both ends are thus held in firm frictional contact and will effectually prevent leakage therethrough in either direction.

The forward end of the tube 11 is connected to the faucet 3 of the wagon tank by any suitable piping 17, and has constant open communication therewith.

The rear end of the tube is turnably mounted in a faucet 18 rigidly secured to the tank 4 by means of a suitably formed bracket 19.

Either of the chambers 5 and 6 plus the space in the tube up to the forward end of the wall 12 is to be of such a size as to contain exactly five gallons of fluid, this being the standard unit of measurement for gasolene, distillate, oils, etc., for which my device is particularly designed.

To offset any possible variation in the sizes of the chambers 5 and 6 and to insure an accurate volume of fluid therein, I provide deep plugs 19$^a$ of large diameter adapted to be adjustably threaded into the forward end of each chamber. By the manipulation of these plugs, the area of either chamber may be increased or decreased to the exact desired size.

A cylinder sleeve 20 is secured to the rear ends of the tank 4 concentric with the tube 11 and projecting over the locknuts 16$^a$ thereon on which are tightly but turnably mounted dial disks 21 and 22, each provided with suitably spaced ratchets 23 and 24 respectively, in opposed relation. Each notch is marked from 0 up in multiples of five, as at 25. Secured to the tube 11 at the rear of these dials is a hand lever 26 having opposed spring pressed pawls 27 and 28 thereon adapted to engage with the ratchets 23 and 24 respectively.

The lever arm is adapted to have a throw of 180°, being held against further movement in either direction by impinging against the bracket 19. The pawls 27 and 28 are held from engagement with their respective ratchets at all points in the travel of the lever 26 except near the ends of such travel by reason of a curved guard 29 positioned over the dials and permitting the pawl 27 to engage only one of the notches 23 and similarly the pawl 28 with respect to the notches 24.

The filling and emptying of each chamber simultaneously is positive and automatic with the turning of the lever 26, but in order that the operator may be sure a level indicator 30 of any of the common forms is positioned on top of each compartment.

A small ball-seat air vent member 31 is adapted to be positioned in the top of each chamber, the ball 32 being so connected to its float 33 that the ball will seat when the chamber is full, but will drop of its own weight to admit air as soon as the level of the fluid is lowered.

Figure 2:
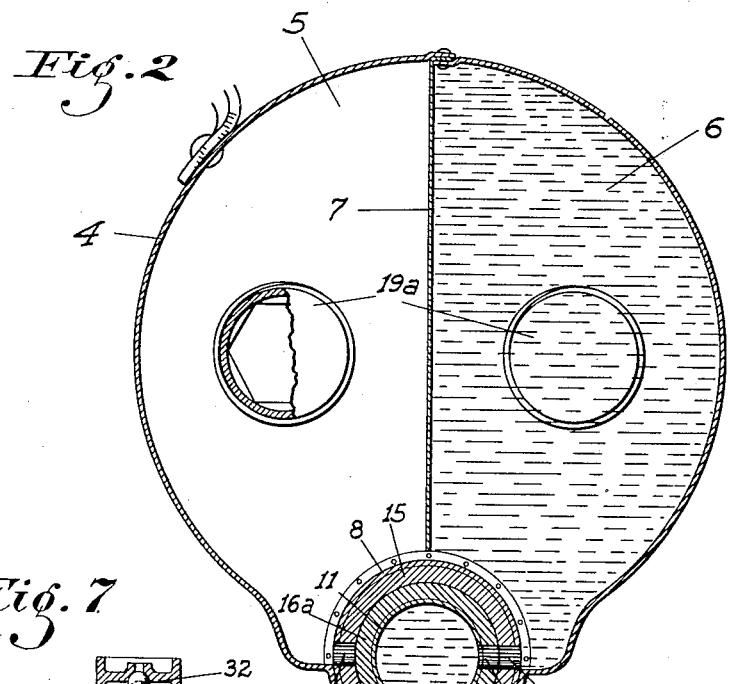
Fig. 2 is an enlarged cross-section of the device relatively on a line 2—2 of Fig. 1.
Figure 7:
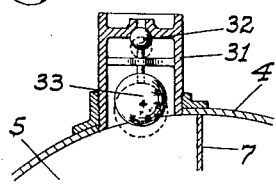
Fig. 7 is a fragmentary sectional view of an air vent device on top of each chamber of the dispensing tank.

The operation of the device is as follows, referring particularly to Figs. 2, 3 and 5:

Supposing the lever 26 to be downward, as in Fig. 3, in which it is near the end of its stroke and the pawl 27 just engaging the 0 gallon mark ratchet on the dial 21, with the completion of the stroke the 5-gallon notch is positioned where the zero mark now is, which indicates to the operator that five gallons have been discharged. With the lever 26 in the position indicated, the port 14 in the tube 11 is in communication with the port 10 in the sleeve 8 opening into the chamber 5, permitting the fluid to flow from this chamber into the tube 11 and out through the faucet 18, which is preferably fitted with a hose 32 leading down into the station tank, usually underground.

At the same time, the port 9 in the sleeve 8 opening into the chamber 6 is in open communication with the port 13 at the forward end of the tube 11, thus permitting a free flow of fluid into the chamber 6 from the wagon tank 1 through the piping 17 and tube 11 at the same time and as rapidly as the chamber 5 is being emptied.

When the lever 26 is thrown over to the other side after draining the chamber 5, the zero notch on the dial 22 is moved down until the 5-gallon notch is in alinement and the ports 13 and 14 then register with the ports 9 and 10 in reverse order, allowing the empty chamber 5 to refill, and the full chamber 6 to be emptied. This operation may be carried out indefinitely.

With each separate delivery of fluid, however, the dials should be turned by hand and reset to zero.

Thus, from the foregoing description it will readily be seen that I have produced such a device as substantially fulfils the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:—

1. A volumetric dispenser for liquids comprising a tank divided into two equal chambers of predetermined size, a longitudinal sleeve at the lower edge of the tank between the two chambers, a tube turnably mounted in the sleeve, one end thereof being connected to a source of supply and the other end forming an outlet, and means whereby the liqid entering the tube may be passed into one chamber to fill the same while at the same time the other chamber is being emptied through the outlet.

2. A volumetric dispenser for liquids comprising a tank, a partition wall vertically lengthwise of the same positioned to divide the tank into two equal and separate chambers and terminating at its lower end in a tubular sleeve, provided with a pair of opposed ports at each end giving communication with both chambers at both ends, a tube turnably mounted in the sleeve, one end of the tube being connected with a source of supply and the other end forming an outlet, and a partition wall midway in the tube, the tube being provided with an opposed port at each end thereof adapted to register alternately with the opposite ones of the ports in the sleeve.

3. A volumetric dispenser for liquids comprising a tank, a partition wall vertically lengthwise of the same positioned to divide the tank into two equal and separate chambers and terminating at its lower end in a tubular sleeve, provided with a pair of opposed ports at each end giving communication with both chambers at both ends, a tube turnably mounted in the sleeve, one end of the tube being connected with a source of supply and the other end forming an outlet, a partition wall midway in the tube, the tube being provided with an opposed port at each end thereof adapted to register alternately with the opposite ones of the ports in the sleeve, and a lever on the end of the tube whereby the same may be turned to place the ports in communication with either of the respective ports in the sleeve.

4. A volumetric dispenser for liquids comprising a tank, a partition wall vertically lengthwise of the same positioned to divide the tank into two equal and separate chambers and terminating at its lower end in a tubular sleeve, provided with a pair of opposed ports at each end giving communication with both chambers at both ends, a tube turnably mounted in the sleeve, one end of the tube being connected with a source of supply and the other end forming an outlet, a partition wall midway in the tube, the tube being provided with an opposed port at each end thereof adapted to register alternately with the opposite ones of the ports in the sleeve, a lever on the end of the tube whereby the same may be turned to place the ports in communication with either of the respective ports in the sleeve, and means whereby when a chamber is emptied the quantity of liquid dispensed will be indicated.

5. A volumetric dispenser for liquids comprising a tank, a partition wall vertically lengthwise of the same positioned to divide the tank into two equal and separate chambers and terminating at its lower end in a tubular sleeve, provided with a pair of opposed ports at each end giving communication with both chambers at both ends, a tube turnably mounted in the sleeve, one end of the tube being connected with a source of supply and the other end forming an outlet, a partition wall midway in the tube, the tube being provided with an opposed port at each end thereof adapted to register alternately with the opposite ones of the ports in the sleeve, a lever on the end of the tube whereby the same may be turned to place the ports in communication with either of the respective ports in the sleeve, and means whereby when a chamber is emptied the quantity of liquid dispensed will be indicated, such means including a notched dial for each chamber, each notch on each dial having a volumetric denoting mark thereon advancing in multiples of a unit of measurement and opposed spring-pressed pawls on the lever, each adapted to engage a notch on one of the dials to move it around when turned to place the respective chamber in communication with the discharge outlet of the tube.

6. A volumetric dispenser for liquids comprising a tank divided into two equal chambers of predetermined size, a longitudinal sleeve at the bottom of the tank between the two chambers, one end thereof being connected to a source of supply and the other end forming an outlet and being adapted to discharge the liquid from either chamber while the other is filling, a tube turnably mounted in the sleeve and controlling the flow of liquid into and from each chamber in turn, a lever on the tube for turning the same, and means actuated by the lever whereby with the recurring discharge of either chamber the total amount of liquid dispensed therefrom will be indicated as a multiple of the unit of capacity of such chamber.

In testimony whereof I affix my signature in presence of two witnesses.

CHARLES H. GUNN.

Witnesses:
VERADINE WARNER,
BERNARD PRIVAT.